Patented Oct. 27, 1925.

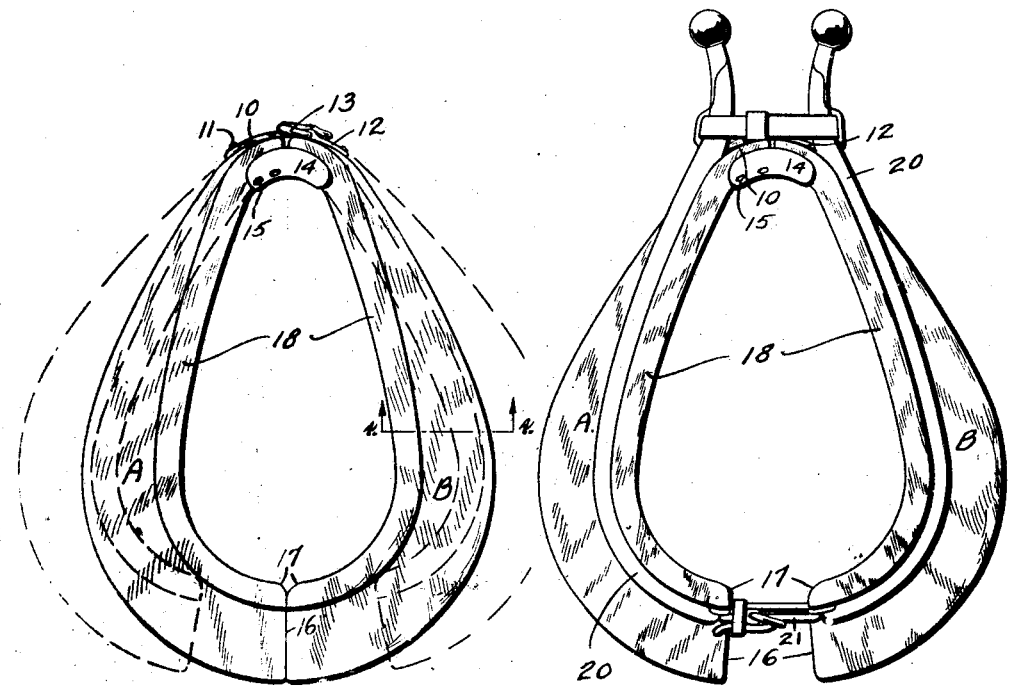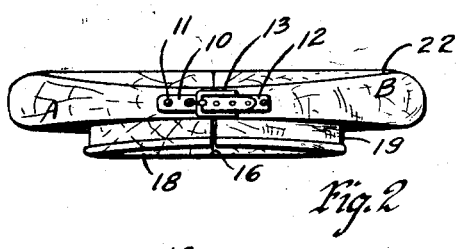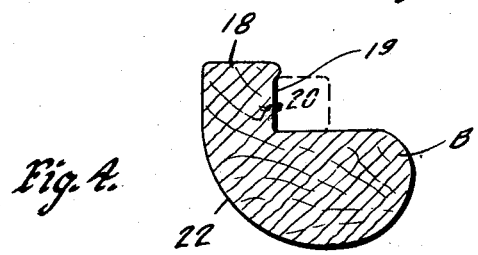

1,559,209

UNITED STATES PATENT OFFICE.

WILLIAM VISSER, OF LOVILLIA, IOWA.

HORSE COLLAR.

Application filed April 25, 1924. Serial No. 708,893.

*To all whom it may concern:*

Be it known that I, WILLIAM VISSER, a citizen of the United States, and a resident of Lovillia, in the county of Monroe and State of Iowa, have invented a certain new and useful Horse Collar, of which the following is a specification.

The object of my invention is to provide a horse collar of simple, durable and comparatively inexpensive construction.

More particularly, it is my object to provide a horse collar made of two halves, arranged to be connected together at their upper ends by a strap and buckle connection, so as to permit the lower ends to be spread apart or pushed together, in order to fit snugly around the neck and front shoulders of a horse.

Still a further object is to provide a horse collar made of two halves formed of wood, and so shaped as to conform to the neck and front shoulders of the horse for permitting the collar to be worn by the horse in a more satisfactory manner, and at the same time eliminating bruising and rubbing of the horse by a loose collar or a collar that is too large.

Still a further object is to provide a collar formed of halves hingedly connected together at their upper ends and capable of having their lower ends swung in or out, whereby a collar may be snugly fastened around the neck and front shoulders of a horse regardless of the size of the neck of the horse.

With these and other objects in view, my invention consists in the construction, arrangement and combination of the various parts of my horse collar, whereby the objects contemplated are attained, as hereinafter more fully set forth, pointed out in my claim, and illustrated in the accompanying drawings, in which:

Figure 1 is a front view of my improved horse collar, one position of the members being shown in dotted lines.

Figure 2 is a top, plan view.

Figure 3 is a front view, showing the lower ends of the collar members spread apart and held against any further spreading by hames; and Figure 4 is a detail, sectional view taken on the line 4—4 of Figure 1.

In the accompanying drawings, I have used the reference characters A and B to indicate generally the two halves of a horse collar, which are formed of wood.

The section A at its upper end has a strap 10 secured thereto by suitable fastening devices 11.

In view of the fact that the collar half or member A is formed of wood enables me to use screws or nails for fastening the strap 10 to the member A.

Secured to the upper end of the member B by means of a strap 12 is a buckle 13, which coacts with the strap 10 for forming a hinged connection between the upper ends of the members A and B, whereby their lower ends may be spread apart as desired.

A protecting cover 14 is secured to the member A by means of suitable fastenings 15, which extend below the upper ends of the members A and B for protecting the animal against possible pinching, due to the two spaced ends of the members A and B.

The protecting cover 14 extends over the joint between the two members A and B and is curved in cross section both longitudinally and transversely.

The lower ends of the members A and B are each provided with flat surfaces 16, which are adapted to abut against each other, when the members A and B are in their closed position.

The flat surfaces 16 form a continuous line with the inner surfaces of the members A and B and are provided with a curved portion 17, so as to prevent any possible binding or pinching at the lower ends of the members A and B.

Each of the members A and B are provided with a forwardly extending extension 18, which is formed with a groove 19 on its outer surface for receiving hames 20, which are of the ordinary construction.

The hame strap 21 holds the two halves of the collar members A and B together, in snug position around the neck of the animal.

It will be noted that the adjustment of the members A and B can be accomplished by the hame strap 21.

The inner surfaces of the members A and B are curved as at 22, so as to conform as nearly as possible to the contour of the horse's neck, whereby the entire collar may be used with the least amount of discomfort to the animal.

The wood members A and B, which form the collar, may be polished or varnished and the members A and B can also be used in connection with the ordinary felt pad sometimes placed between the animal and the under surface of the collar members.

One of the advantages of my structure is the fact that it is made of wood, which enables me to so form the surface abutting against the animal, as to permit it to rest against the animal and fit as snugly as possible.

It may be mentioned that wood is far better for horse's collars than leather, because it enables the inner surfaces of the collar members A and B to be quickly and easily formed with various contours or surfaces.

It may be further mentioned that by making the collar members A and B out of wood, I entirely eliminate the danger of the ordinary collar from being torn and ripped, and thereby effect a great saving with my particular type and structure of a collar.

It will also be noted that a wood collar formed of two halves enables the collar to be placed around the neck of the animal, each section or member at a time, without spreading or stretching any of the parts, as is ordinarily required with the present-day collar.

Some changes may be made in the construction and arrangement of the various parts of my horse collar, without departing from the essential features and purposes of my invention, whereby it is my intention to cover by my claim, any modified forms of structure or use of mechanical equivalents which may be reasonably included within its scope.

I claim as my invention:

A horse collar comprising a pair of similar halves formed of wood, said halves having their under surfaces shaped to conform to the neck and shoulders of the horse, a strap and buckle connection at the upper ends of said halves, and their lower ends being formed with flat surfaces, said halves being capable of having their lower ends swing apart for permitting the halves to be used as a collar upon horses of various sizes, hame receiving flanges formed on said halves, hames on said flanges and a hame strap for retaining the halves of the collar in proper position.

Des Moines, Iowa, April 3, 1924.

WILLIAM VISSER.